United States Patent
Tage et al.

(10) Patent No.: US 9,581,236 B2
(45) Date of Patent: Feb. 28, 2017

(54) STRUCTURE FOR LUBRICATING TRANSMISSION

(71) Applicant: MAZDA MOTOR CORPORATION, Hiroshima (JP)

(72) Inventors: Shinya Tage, Hiroshima (JP); Noriyuki Wada, Hiroshima (JP); Yasuki Okadome, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/431,496

(22) PCT Filed: Feb. 7, 2014

(86) PCT No.: PCT/JP2014/000668
§ 371 (c)(1),
(2) Date: Mar. 26, 2015

(87) PCT Pub. No.: WO2014/155933
PCT Pub. Date: Oct. 2, 2014

(65) Prior Publication Data
US 2015/0276041 A1    Oct. 1, 2015

(30) Foreign Application Priority Data
Mar. 29, 2013  (JP) ................................ 2013-070906

(51) Int. Cl.
*F16H 57/04* (2010.01)
*F16H 3/089* (2006.01)

(52) U.S. Cl.
CPC ....... *F16H 57/0423* (2013.01); *F16H 57/042* (2013.01); *F16H 57/0431* (2013.01);
(Continued)

(58) Field of Classification Search
CPC ......................... F16H 57/0423; F16H 57/0457
See application file for complete search history.

(56) References Cited

U.S. PATENT DOCUMENTS

| 4,222,283 A * | 9/1980 | Nagy ...................... F16H 3/089 |
| | | 184/11.2 |
| 6,223,858 B1 * | 5/2001 | Ubagai ............... F16H 57/0423 |
| | | 184/11.1 |

(Continued)

FOREIGN PATENT DOCUMENTS

| JP | S56-162357 U | 12/1981 |
| JP | 2006-071038 A | 3/2006 |

(Continued)

OTHER PUBLICATIONS

Notification of Transmittal of Translation of the International Preliminary Report on Patentability and Translation of Written Opinion of the International Searching Authority; PCT/JP2014/000668; issued on Oct. 8, 2015.

(Continued)

*Primary Examiner* — Minh Truong
(74) *Attorney, Agent, or Firm* — Studebaker & Brackett PC

(57) ABSTRACT

An oil-feeding member (100) catches oil picked up by a gear, and is provided with a gutter (132) guiding the oil from one side to the other of a transmission in an axial direction. The gutter (132) has a bottom which is divided into a first bottom portion (141) and a second bottom portion (142). The second bottom portion (142) is provided with an oil-dripping hole (142a, 142b). The first and second bottom portions (141, 142) are configured so that (i) the oil flows over only the first bottom portion (141) toward the other side if an amount of the oil caught by the oil-feeding member (100) is smaller than or equal to a predetermined amount, and that (ii) the oil flows over both of these bottom portions (141, 142) toward the other side if the amount of the oil is greater than the predetermined amount.

9 Claims, 10 Drawing Sheets

(52) U.S. Cl.
CPC ..... *F16H 57/0457* (2013.01); *F16H 57/0494* (2013.01); *F16H 3/089* (2013.01); *F16H 2200/0052* (2013.01)

(56) References Cited

U.S. PATENT DOCUMENTS

| | | | | |
|---|---|---|---|---|
| 7,513,172 | B2* | 4/2009 | Takahashi | F16H 57/0423 184/6.12 |
| 8,079,445 | B2* | 12/2011 | Aoyama | F16H 57/0423 184/11.1 |
| 8,875,841 | B2* | 11/2014 | Yoshimi | F16H 3/006 184/6.12 |
| 9,074,679 | B2* | 7/2015 | Araki | F16H 57/0423 |
| 2007/0151411 | A1* | 7/2007 | Suzuki | F16H 57/0423 74/606 R |
| 2011/0214947 | A1 | 9/2011 | Tuomas | |
| 2016/0033028 | A1* | 2/2016 | Tage | F16H 57/0423 475/160 |

FOREIGN PATENT DOCUMENTS

| | | |
|---|---|---|
| JP | 2011-137493 A | 7/2011 |
| JP | 2011-185332 A | 9/2011 |

OTHER PUBLICATIONS

International Search Report; PCT/JP2014-000668; Apr. 22, 2014.

* cited by examiner

US 9,581,236 B2

STRUCTURE FOR LUBRICATING TRANSMISSION

TECHNICAL FIELD

The present invention relates to a structure for lubricating a transmission mounted on a vehicle and, in particular, to a structure for lubricating a manual transmission using a gear that picks up oil.

BACKGROUND ART

Lubrication of a manual transmission involves feeding lubricating oil to, for example, bearings for an input shaft and an output shaft, meshing engagements of speed-changing gears, and loosely-fitting engagements for gears provided for the input and output shafts and a synchronizer. Such oil is typically fed by oil pick-up feeding. Specifically, the oil stored on the bottom of a transmission case is picked up by rotating gears, received by a gutter-shaped oil-feeding member, and then fed to each of parts to be lubricated.

For example, Patent Document 1 discloses an oil feeding apparatus that is included in a transmission case combined with a case for a differential gear system, and used for a vehicle having a front-engine, front-wheel-drive (FF) layout. The oil feeding apparatus picks up oil with a large-diameter differential ring gear which is arranged at the lowest internal portion of the transmission case and which provides power from the transmission to the differential gear system. Then, the oil feeding apparatus introduces this oil from the front (near the engine) of the transmission to a storage member (oil-feeding member) arranged above input and output shafts so that the oil is poured into a storage part of the storage member. After that, the oil feeding apparatus guides the oil to the rear (across from the engine) of the transmission to allow the oil drip from an oil-dripping hole which is cut through the bottom of the storage part, to the input shaft, the output shaft, the meshing engagements of the speed-changing gears, and the synchronizer, as well as to feed the oil from a rear end of the input shaft to an intra-shaft oil passage inside the input shaft.

The oil feeding apparatus disclosed in Patent Document 1, however, primarily uses the differential ring gear to feed the picked up oil to each of the parts to be lubricated. Thus, the oil feeding apparatus cannot sufficiently catch the picked up oil in the storage member when the differential ring gear is rotating in the reverse direction to reverse the vehicle. Hence, when the vehicle is reversed, each of the parts to be lubricated could be fed with the oil in an insufficient amount.

In contrast, Patent Document 2 discloses the use of driven gears that are loosely fitted to an output shaft, which is positioned lower than an input shaft, and in particular, the use of a driven gear with a relatively large diameter which is included in a gear train for a transmission gear range of forward and low speed. By rotating this driven gear, the oil stored on the bottom of a transmission case is picked up, and then caught in an oil gutter (oil-feeding member).

This allows the driven gear (which is loosely fitted to the output shaft and included in the gear train for the transmission gear range of forward and low speed) to rotate in the same direction when the vehicle moves backward as well as forward. As a result, even when the vehicle moves backward, the oil can also be picked up, caught by the oil-feeding member, and then fed to each of parts to be lubricated.

CITATION LIST

Patent Document

PATENT DOCUMENT 1: Japanese Unexamined Patent Publication No. 2011-185332
PATENT DOCUMENT 2: Japanese Unexamined Patent Publication No. 2011-137493

SUMMARY OF THE INVENTION

Technical Problem

In order to improve the fuel efficiency of engines, manual transmissions are required to reduce the amount of oil stored in a transmission case to the point that the vehicle's weight and oil agitation resistance caused by, for example, a differential ring gear can be reduced sufficiently. Therefore, the amount of the stored oil should be reduced as much as possible as long as it is possible to ensure that a lower portion of the gear, which picks up the oil, is dipped into the oil stored on the bottom of the transmission case.

Here, the driven gear, which is included in the gear train for the transmission gear range of forward and low speed, could pick up the oil. Even so, if the differential ring gear cannot pick up the oil when the vehicle is moving backward, for example, the oil-feeding member will not catch so large an amount of oil. In that case, it will be even more difficult to secure a required amount of oil for parts that should be lubricated in the transmission if only an insufficient amount of oil can be stored on the bottom of the transmission case.

It is therefore an object of the present invention to provide a transmission-lubricating structure that can certainly feed a required amount of oil to a target part-to-be-lubricated while minimizing the amount of oil stored in the transmission case.

Solution to the Problem

In order to achieve this object, the present invention provides a structure for lubricating a transmission for a vehicle. The structure includes an oil-feeding member arranged in a transmission case and configured to catch oil picked up by a gear. The oil-feeding member includes a gutter with an oil-dripping hole that is cut through a bottom of the gutter. The gutter guides the oil that has been caught from one side to the other of the transmission in an axial direction to feed the oil to a part-to-be-lubricated which is provided in the transmission case and positioned on the other side. The oil-dripping hole allows the oil to drip to an intermediately placed part-to-be-lubricated which is also provided in the transmission case and positioned at an intermediate position in the axial direction. The bottom of the gutter is divided into a first bottom portion and a second bottom portion. The oil-dripping hole is cut through the second bottom portion. The first and second bottom portions are configured so that (i) the oil flows over only the first bottom portion toward the other side if an amount of the oil caught by the oil-feeding member is smaller than or equal to a predetermined amount, and that (ii) the oil flows over both of the first and second bottom portions toward the other side if the amount of the oil caught by the oil-feeding member is greater than the predetermined amount.

If the amount of the oil caught by the oil-feeding member is greater than the predetermined amount, this structure allows the oil to flow over both of the first and second bottom portions of the gutter of the oil-feeding member toward the other side of the transmission in the axial direction and eventually be fed to the part-to-be-lubricated on the other side. In addition, this structure also allows the oil to drip through the oil-dripping hole of the second bottom portion and be fed to the intermediately placed part-to-be-lubricated.

On the other hand, if the amount of the oil caught by the oil-feeding member is smaller than or equal to the predetermined amount, the oil flows over only the first bottom portion toward the other side. This contributes to reducing the amount of oil dripping through the oil-dripping hole of the second bottom portion to the intermediately placed part-to-be-lubricated.

Hence, in a situation where the amount of the oil caught by the oil-feeding member varies according to the operating state of the transmission, if the intermediately placed part-to-be-lubricated does not require the oil to be fed through the oil-dripping hole when the transmission is in a predetermined operating state in which the amount of oil caught decreases, this structure can reduce unnecessary oil dripping to the intermediately placed part-to-be-lubricated when the transmission is in the predetermined operating state. This contributes to feeding the oil effectively to the part-to-be-lubricated on the other side that should be fed with the oil.

In this manner, unnecessary oil feeding is cut down when only a little oil is caught. This contributes to feeding the oil to a part-to-be-lubricated just as intended, while reducing the amount of oil to be stored in the transmission case.

In one embodiment of the structure for lubricating the transmission, the first bottom portion of the gutter may be formed so as to have a narrower width on the other side than on the one side.

According to such an embodiment, if the second bottom portion provided with the oil-dripping hole is arranged along with a part of the first bottom portion with a narrower width on the other side, an increase in the overall width of the gutter can be reduced. As a result, the oil-feeding member can be stored in the transmission case more easily. In addition, by narrowing the width of that part of the first bottom portion on the other side (i.e., its downstream part), that downstream part of the first bottom portion can accelerate the flow of the oil running over the first bottom portion toward the part-to-be-lubricated on the other side.

In another embodiment of the structure for lubricating the transmission, the first and second bottom portions may be separated from each other by a rib or step provided on the bottom of the gutter.

This provides a simple and low-cost structure for separating the first bottom portion from the second bottom portion.

In still another embodiment of the structure for lubricating the transmission, the part-to-be-lubricated on the other side includes a bearing configured to support a secondary shaft which extends parallel to a primary shaft acting as an input shaft of the transmission. The gear includes a differential ring gear and a driven gear included in a gear train for a transmission gear range of forward and low speed. The differential ring gear rotates, when the vehicle is moving backward, in an opposite direction from when the vehicle is moving forward. The driven gear is loosely fitted to the secondary shaft and rotates, when the vehicle is moving backward, in the same direction as when the vehicle is moving forward. The oil-feeding member is configured to catch the oil picked up by the differential ring gear and the driven gear when the vehicle is moving forward, and catch the oil picked up only by the driven gear when the vehicle is moving backward. The intermediately placed part-to-be-lubricated transmits power through the transmission when the vehicle is moving forward and leaves the power untransmitted when the vehicle is moving backward.

This allows the oil-feeding member to catch the oil which has been picked up by the differential ring gear and the driven gear that is loosely fitted to the secondary shaft and included in the gear train for a transmission gear range of forward and low speed when the vehicle is moving forward. As a result, the amount of the oil caught by the oil-feeding member exceeds the predetermined amount, and the oil flows over both of the first and second bottom portions of the gutter. Consequently, in an operating state of the transmission when the vehicle is moving forward, the oil can be fed just as intended to the bearing that supports the secondary shaft and that should be fed with oil. In addition, through the oil-dripping hole of the second bottom portion, the oil can also be fed without fail to the intermediately placed part-to-be-lubricated that should be fed with the oil when the vehicle is moving forward. Specifically, the oil can also be fed to a synchronizer and meshing engagements of the gears included in a gear train for a transmission gear range of forward and middle to high speed.

On the other hand, when the vehicle is moving backward—that is, when the oil picked up by the differential ring gear is not caught by the oil-feeding member—the amount of the oil caught by the oil-feeding member is smaller than the predetermined amount. As a result, the oil caught by the oil-feeding member flows over the first bottom portion. Consequently, this can prevent excessive oil from being fed unnecessarily to the intermediately placed part-to-be-lubricated that does not transmit power (in other words, that does not have to be fed with oil) when the vehicle is moving backward, while allowing the oil to be fed just as intended to the bearing that should be fed with oil even when the vehicle is moving backward.

Advantages of the Invention

As described above, a structure for lubricating a transmission according to the present invention includes an oil-feeding member that catches oil picked up by a gear. The oil-feeding member is provided with a gutter that guides the oil from one side to the other of the transmission in an axial direction. The gutter has a bottom which is divided into a first bottom portion and a second bottom portion. The second bottom portion is provided with an oil-dripping hole. The first and second bottom portions are configured so that (i) the oil flows over only the first bottom toward the other side if an amount of the oil caught by the oil-feeding member is smaller than or equal to a predetermined amount, and that (ii) the oil flows over both of the first and second bottom portions toward the other side if the amount of the oil caught by the oil-feeding member is greater than the predetermined amount. Hence, if the amount of the oil caught by the oil-feeding member is greater than the predetermined amount, the oil can be fed to the parts to be lubricated on the other side and at the intermediate position that need oil feeding. On the other hand, if the amount of the oil is smaller than or equal to the predetermined amount, only a reduced amount of oil is fed to the intermediately placed part-to-be-lubricated that does not need oil feeding. Consequently, when only a little oil is caught by the oil-feeding member, the oil will not be fed in vain. This contributes to feeding the oil just as intended to only a target part-to-be-lubricated, while reducing the amount of the oil stored in the transmission case.

DESCRIPTION OF EMBODIMENT

Embodiments of the present invention will now be described in detail with reference to the drawings.

Figure 1:
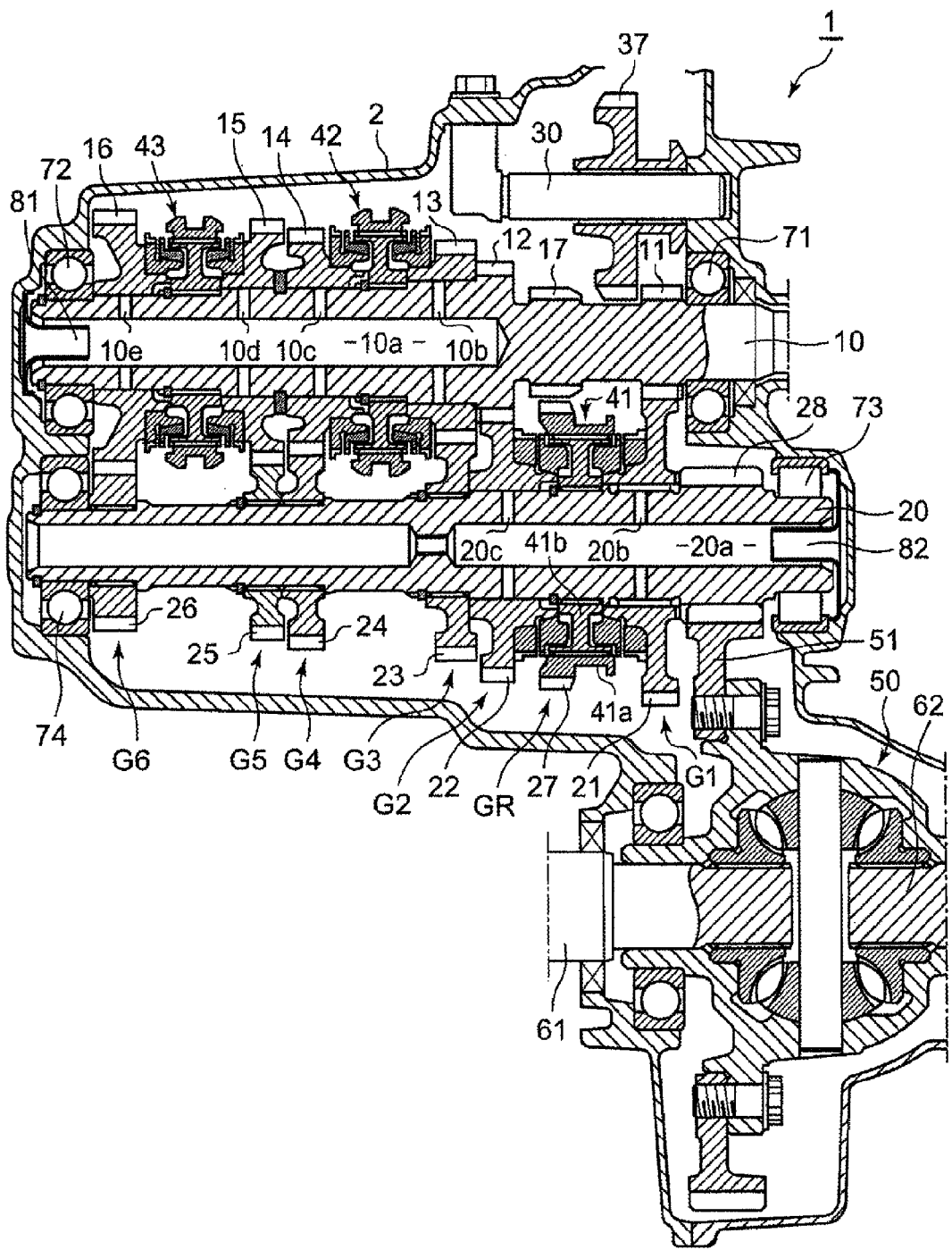
FIG. 1 is a developed cross-sectional view illustrating a basic structure for a transmission which adopts a lubricating structure according to an embodiment of the present invention.

First, the structure of a transmission 1 which adopts a lubricating structure according to this embodiment will be described with reference to FIG. 1. An engine (not shown) is arranged on the right-hand side of the paper on which FIG. 1 is drawn with respect to the transmission 1. The engine provides power to a primary shaft 10 that is connected to an output shaft of the engine via a clutch and that acts as an input shaft of the transmission 1. The direction in which the primary shaft 10 extends (i.e., the horizontal direction in FIG. 1) is the axial direction of the transmission 1. The front end of the transmission 1 faces the engine (i.e., located on the right-hand side of FIG. 1) in the axial direction of the transmission 1, and the rear end of the transmission 1 is opposite from the engine (i.e., located on to the left-hand side of FIG. 1). In the following description, the front and rear of the transmission 1 will be simply hereinafter referred to as a "front" and a "rear", respectively.

The transmission 1 is mounted laterally in the engine room in a front portion of a vehicle such that its axial direction is parallel to the width direction of the vehicle.

In this embodiment, the transmission 1 is a six-speed-plus-reverse manual transmission. The primary shaft 10 and a secondary shaft 20 are arranged in a transmission case 2 (hereinafter simply referred to as a "case 2") of the transmission 1. Here, the secondary shaft 20 is arranged parallel to the primary shaft 10 and acts as the output shaft of the transmission 1. Furthermore, between the primary shaft 10 and the secondary shaft 20, a plurality of gear trains are arranged in the following order from the front end toward the rear end: a gear train for first gear G1; a gear train for reverse gear GR; a gear train for second gear G2; a gear train for third gear G3; a gear train for fourth gear G4; a gear train for fifth gear G5; and a gear train for sixth gear G6. The power provided from the engine to the primary shaft 10 is transmitted to the secondary shaft 20 via one of these seven gear trains.

The gear train G1 for first gear includes a primary gear 11 for first gear secured to the primary shaft 10, and a secondary gear 21 for first gear (a driven gear included in a gear train for the transmission gear range of forward and low speed) loosely fitted to the secondary shaft 20. The gear train for second gear G2 includes a primary gear 12 for second gear secured to the primary shaft 10, and a secondary gear 22 for second gear (a driven gear included in the gear train for a transmission gear range of forward and low speed) loosely fitted to the secondary shaft 20. Moreover, the gear train for third gear G3 includes a primary gear 13 for third gear loosely fitted to the primary shaft 10, and a secondary gear 23 for third gear secured to the secondary shaft 20. The gear train for fourth gear G4 includes a primary gear 14 for fourth gear loosely fitted to the primary shaft 10, and a secondary gear 24 for fourth gear secured to the secondary shaft 20. The gear train for fifth gear G5 includes a primary gear 15 for fifth gear loosely fitted to the primary shaft 10, and a secondary gear 25 for fifth gear fixed to the secondary shaft 20. The gear train for sixth gear G6 includes a primary gear 16 for sixth gear loosely fitted to the primary shaft 10, and a secondary gear 26 for sixth gear secured to the secondary shaft 20.

The gear train for reverse gear GR includes a primary gear 17 for reverse gear that is secured to the primary shaft 10, a secondary gear 27 for reverse gear that is secured to the secondary shaft 20, and an intermediate gear 37 for reverse gear that is fitted to an intermediate shaft 30 arranged parallel to the primary shaft 10 and the secondary shaft 20. Here, the intermediate shaft 30 is slidable along its own axis.

Furthermore, between the secondary gear 21 for first gear and the secondary gear 22 for second gear, which are loosely fitted to the secondary shaft 20, arranged is a synchronizer 41 for first and second gears. Between the primary gear 13 for third gear and the primary gear 14 for fourth gear, which are loosely fitted to the primary shaft 10, arranged is a synchronizer 42 for third and fourth gears. Between the primary gear 15 for fifth gear and the primary gear 16 for sixth gear, which are loosely fitted to the primary shaft 10, arranged is a synchronizer 43 for fifth and sixth gears. Thus, when the operator operates a gear stick (not shown) to cause sleeves of these synchronizers 41 to 43 to slide toward the front or rear, a loosely-fitted gear to which a sleeve is slid is locked to the primary shaft 10 or the secondary shaft 20. Then, the gear train of the locked gear gets ready to transmit power.

The secondary gear 27 for reverse gear in the gear train for reverse gear GR is provided to a sleeve 41a of the synchronizer 41 for first and second gears. The secondary gear 27 for reverse gear rotates with the secondary shaft 20 via a hub 41b of the synchronizer 41 for first and second gears. Then, when the operator operates the gear stick to cause the intermediate gear 37 for reverse gear to slide toward the rear, the intermediate gear 37 for reverse gear gets engaged with the primary gear 17 for reverse gear and the secondary gear 27 for reverse gear. As a result, the gear train for reverse gear GR gets ready to transmit power.

The secondary shaft 20 has an output gear 28 at its front end. The output gear 28 is engaged with a differential ring gear 51 acting as an input gear of a differential gear system 50. This enables the rotation of the secondary shaft—that is, power generated by the rotation of the transmission 1—to be transmitted to a left axle 61 and a right axle 62 via the differential gear system 50. These axles 61 and 62 are connected to the left and right front wheels, respectively.

The primary shaft 10 has two bearings 71 and 72 which are arranged at the front and rear ends of the primary shaft 10. The primary shaft 10 is rotatably supported by the case 2 via these bearing 71 and 72. The secondary shaft 20 also has two bearings 73 and 74 which are arranged at front and rear ends of the secondary shaft 20. The secondary shaft 20 is rotatably supported by the case 2 via these bearings 73 and 74.

Moreover, the primary shaft 10 also has an intra-shaft oil passage 10a and oil passages 10b to 10e. The intra-shaft oil passage 10a extends along the axis of the primary shaft 10 from the rear end toward the front end thereof. The oil passages 10b to 10e are radially extended outward from the intra-shaft oil passage 10a to form openings through the surface of the primary shaft 10 to which the primary gears 13 to 16 for third to sixth gears are loosely fitted. Behind the bearing 72, arranged is a funnel 81 which is attached to a rear wall 2b (see FIG. 7) of the transmission case 2 and inserted into the intra-shaft oil passage 10a from the rear of the transmission 1.

Likewise, the secondary shaft 20 also has an intra-shaft oil passage 20a and oil passages 20b and 20c. The intra-shaft oil passage 20a extends along the axis of the secondary shaft 20 from the front end toward the rear end thereof. The oil passages 20b and 20c are radially extended outward from the intra-shaft oil passage 20a to form openings through the surface of the secondary shaft 20 to which the secondary gears 21 and 22 for first and second gears are loosely fitted. In front of the bearing 73, arranged is a funnel 82 which is attached to a front wall of the transmission case 2 and inserted into the intra-shaft oil passage 20a from the front of the transmission 1.

Figure 2:
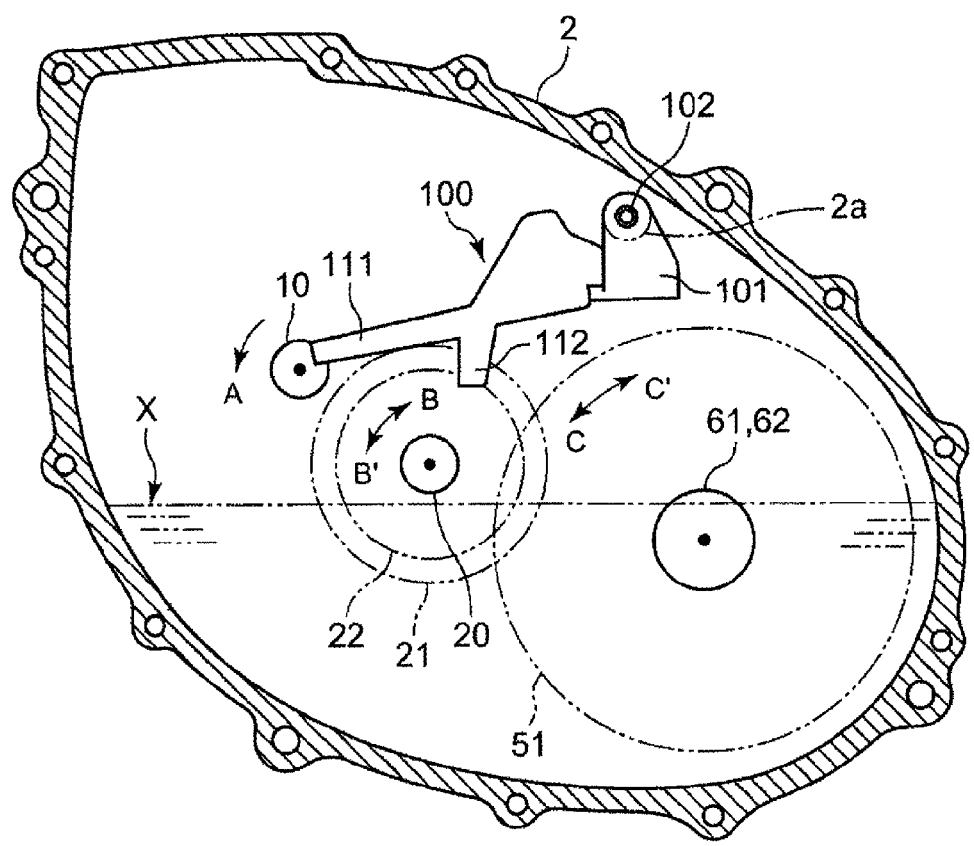
FIG. 2 is a general rear view of the transmission, illustrating an arrangement of an oil-feeding member in the transmission.

As illustrated in FIG. 2, when the vehicle is moving forward, the primary shaft 10 rotates in a direction A, the secondary shaft 20 rotates in a direction B, and the differential ring gear 51 rotates in a direction C. On the other hand, when the vehicle is moving backward, the primary shaft 10 also rotates in the same direction A as when the vehicle is moving forward. Meanwhile, when the vehicle is moving backward, the secondary shaft 20 and the differential ring gear 51 respectively rotate in the opposite directions B' and C' from the ones when vehicle is moving forward.

Note that when the vehicle is moving backward, the secondary gears 21 and 22 for first and second gears, which are provided on the secondary shaft 20 and which are always engaged with the primary gears 11 and 12 for first and second gears that are secured to the primary shaft 10, rotate in the same direction B as well as when the vehicle is moving forward.

Furthermore, when the vehicle is moving forward, the secondary gear 27 for reverse gear, which is included in the gear train for reverse gear GR arranged between the gear trains G1 and G2 for first and second gears, rotates in the same direction B as the secondary gears 21 and 22 for first and second gears. On the other hand, when the vehicle is moving backward, the secondary gear 27 for reverse gear rotates in the opposite direction B' from the one when the vehicle is moving forward.

Furthermore, when the transmission 1 is in the neutral position while the vehicle is at a stop, for example, the secondary gears 21 and 22 for first and second gears on the secondary shaft 20 rotate in the direction B the primary shaft 10 rotates in the direction A, just like when the vehicle is moving forward and backward.

Here, as indicated by the reference sign X in FIG. 2, oil is stored on the bottom of the case 2 to the point that respective lower portions of the differential ring gear 51 and the secondary gears 21 and 22 for first and second gears 21 and 22 are immersed in the oil while the transmission 1 is operating. Likewise, a lower portion of the secondary gear 27 for reverse gear is also immersed in the oil stored on the bottom of the case 2.

Next, a lubricating structure according to this embodiment will be described. Basically, this lubricating structure is provided in order to feed respective parts to be lubricated with oil in the middle to rear end portions of the transmission 1 in the axial direction. Note that parts arranged on the front end of the transmission 1 are sufficiently fed with the oil stored on the bottom of the case 1 and picked up by the rotations of the differential ring gear 51, the secondary gears 21, 22 and 27 for first, second and reverse gears, of which the lower parts are immersed in the oil. Here, those parts include the bearings 71 and 73, the synchronizer 41 for first and second gears, and meshing engagements of the gears in the gear trains for first, second and reverse gears G1, G2, and GR.

Figure 3:
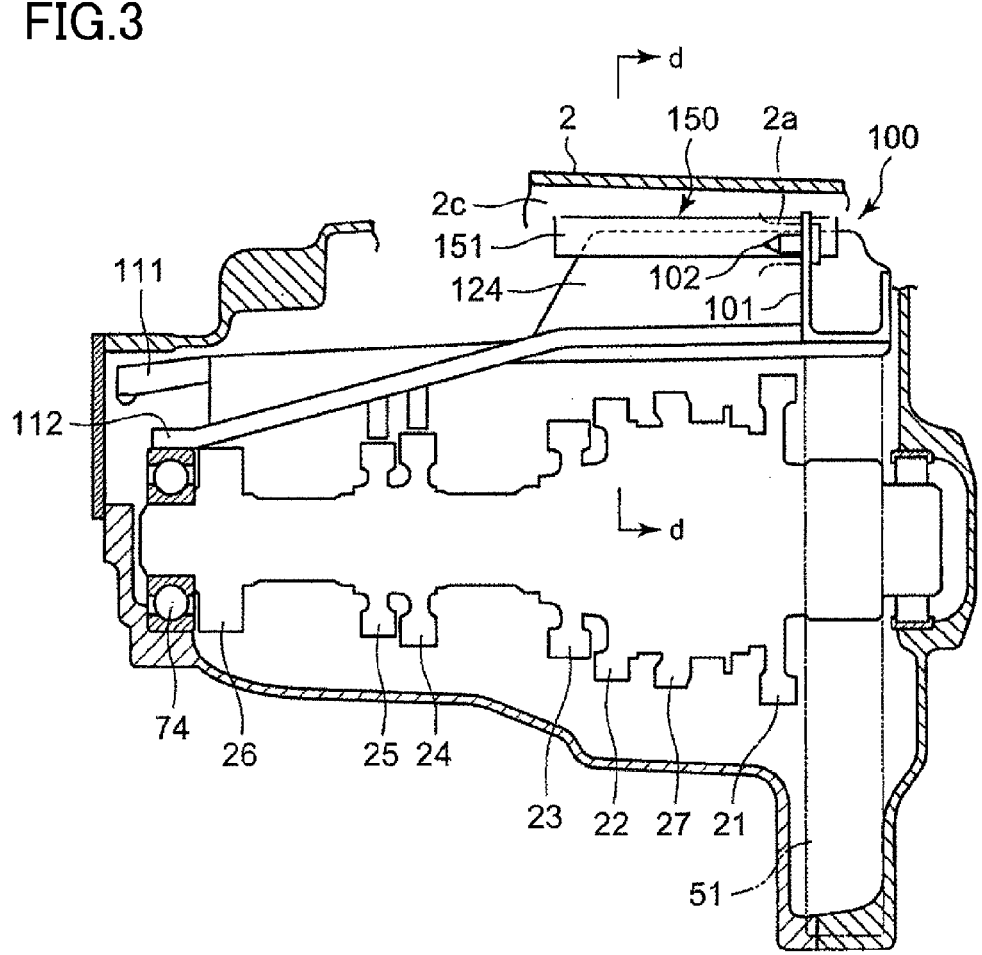
FIG. 3 is a general side view of the transmission.

As illustrated in FIGS. 2 and 3, this lubricating structure includes an oil-feeding member 100 arranged in the case 2 and made of resin. This oil-feeding member 100 is arranged in the space over the respective gears on the secondary shaft 20 and the differential ring gear 51, and extends in the axial direction of the transmission 1. The oil-feeding member 100 has a front end portion. The front end portion is supported by the case 2 with an attaching pin 102 press-fitted from the front side into a hole of a boss 2a provided for a front wall part of the case 2. The attaching pin 102 projects toward the rear to a vertical wall face 101 provided for the front end. The oil-feeding member 100 has a rear end portion. The rear end portion is supported by the case 2 when the tip portions of a first oil feeder 111 and a second oil feeder 112 protruding toward the rear get engaged with the rear wall 2b of the case 2. Note that the structures of the tip portions of the first and second oil feeders 111 and 112 will be described in detail later.

Figure 4:
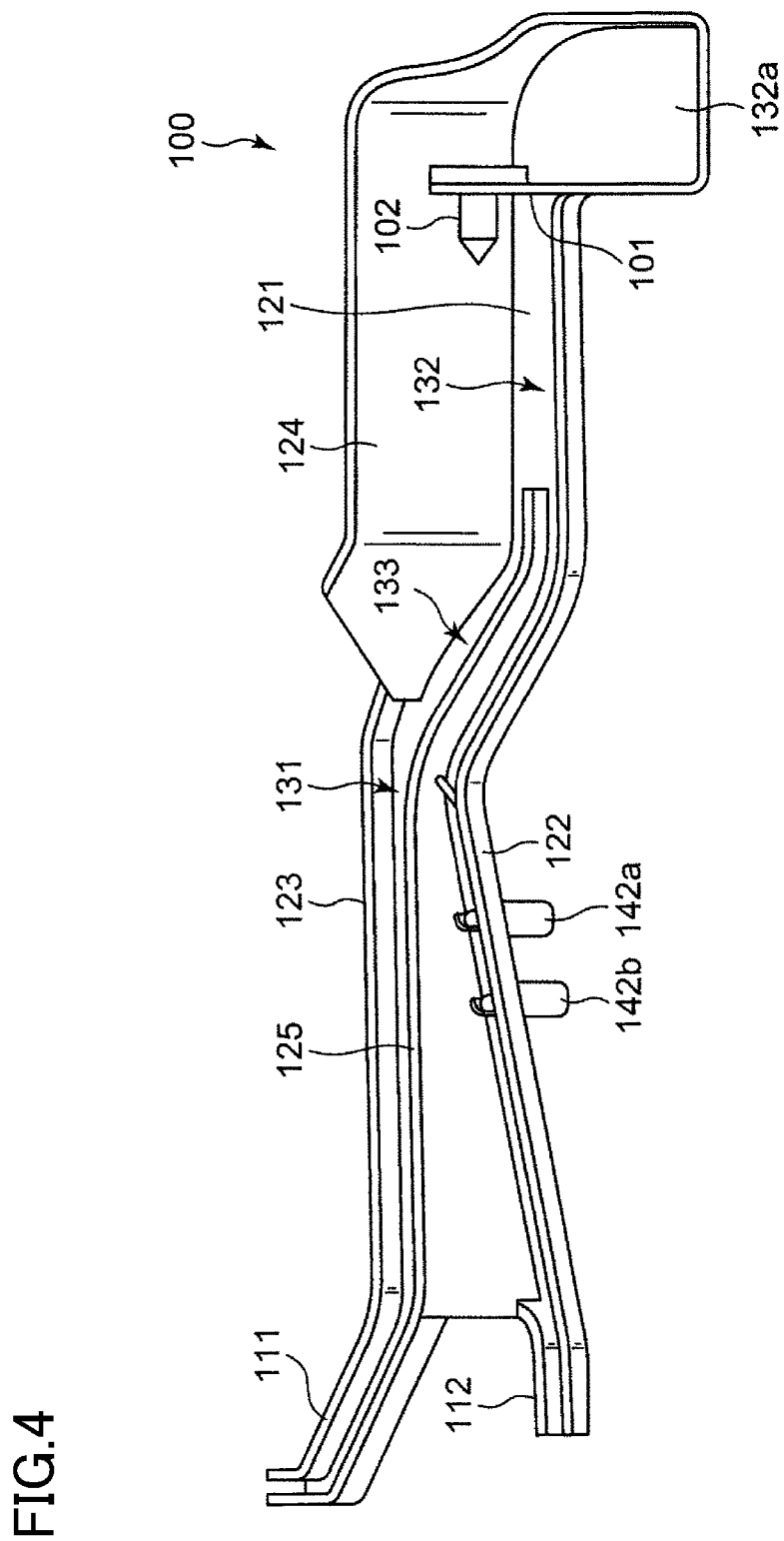
FIG. 4 is a perspective view illustrating the oil-feeding member.
Figure 5:
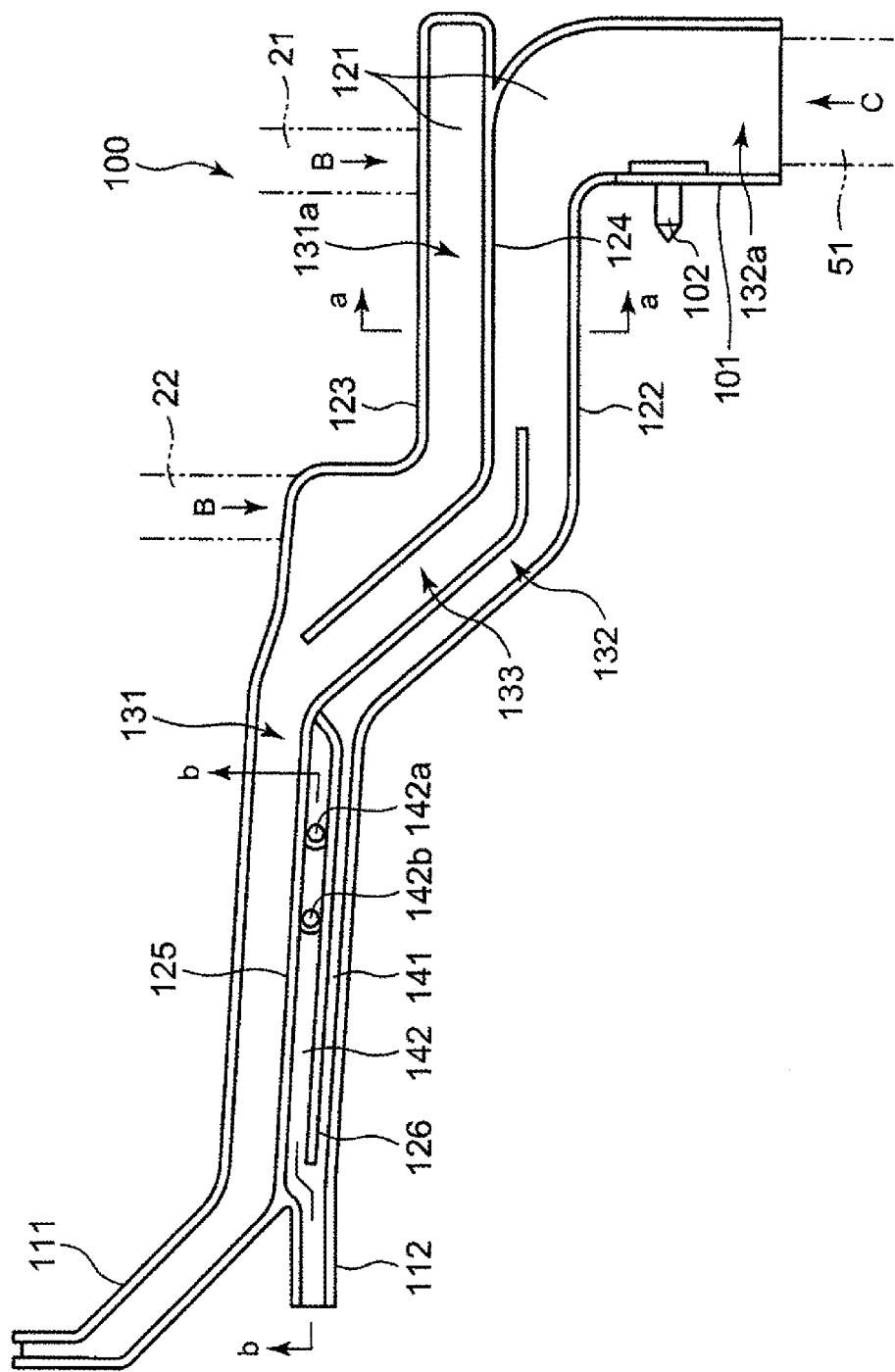
FIG. 5 is a plan view illustrating the oil-feeding member.
Figure 6:
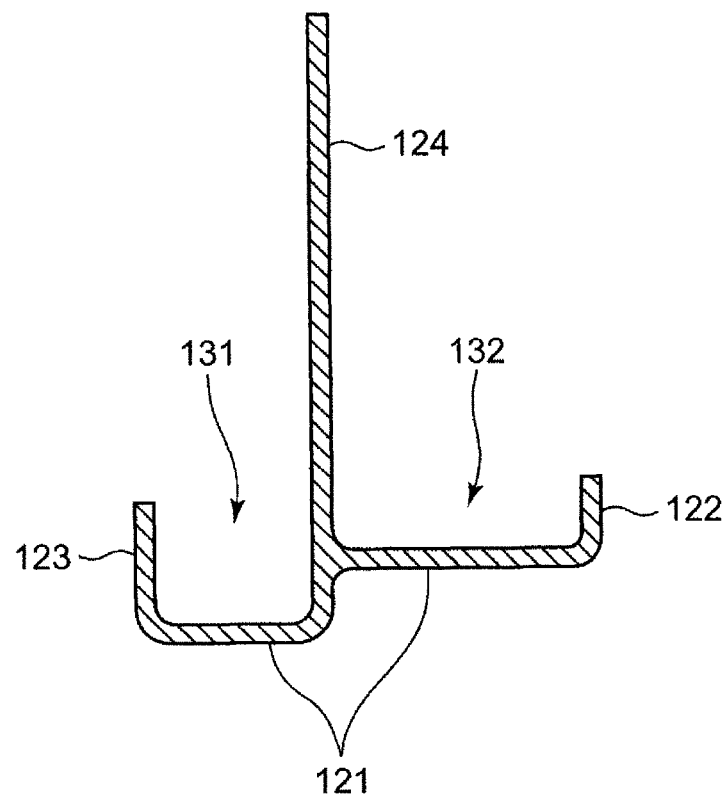
FIG. 6 is an enlarged cross-sectional view of the oil-feeding member as viewed on the plane a-a shown in FIG. 5.

As illustrated in FIGS. 4 to 6, the oil-feeding member 100 includes a bottom wall 121 that extends in the longitudinal direction of the oil-feeding member 100, and side walls 122 and 123, each of which stands upward from an associated one of the end portions of the bottom wall 121 in the width direction. The oil-feeding member 100 is formed in the shape of a gutter to guide oil from the front end (i.e., one end of the transmission 1 in the axial direction) toward the rear end (i.e., the other end of the transmission in the axial direction). Note that the left- and right-hand sides when the oil-feeding member 100 is viewed from a point upstream of the oil flowing direction (i.e., from the front end (i.e., the right-hand side of FIGS. 4 and 5)) will be hereinafter simply referred to as the "left side" and "right side", respectively.

In a portion of the oil-feeding member 100 between the side walls 122 and 123 on the left and right sides, a catching wall 124 and a partition wall 125 are provided. The catching wall 124 is a tall projecting wall that runs from the front end portion toward a longitudinal middle portion of the oil-feeding member 100. The partition wall 125 runs from the longitudinal middle portion to the rear end portion of the oil-feeding member 100 to divide the bottom wall 121 horizontally. In the oil-feeding member 100, a first gutter 131 and a second gutter 132 are defined. The first gutter 131 is a portion defined (i) between the catching wall 124 and the side wall 123 on the right side and (ii) between the partition wall 125 and the side wall 123 on the right side. The second gutter 132 is a portion defined (i) between the catching wall 124 and the side wall 122 on the left side and (ii) between the partition wall 125 and the side wall 122 on the left side. Thus, the first and second gutters 131 and 132 are arranged side by side in the horizontal direction (in the width direction of the first and second gutters 131 and 132), and the catching wall 124 stands between the first and second gutters 131 and 132.

Moreover, a rear portion of the catching wall 124 and a front portion of the partition wall 125 are arranged to overlap with each other in the longitudinal direction of the oil-feeding member 100 (positioned to overlap with each other when viewed in the horizontal direction of the oil-feeding member 100). The rear portion of the catching wall 124 is positioned on the right side, while the front portion of the partition wall 125 is positioned on the left side. The portion of the oil-feeding member 100 between the overlapping rear and front portions of the catching wall 124 and partition wall 125 is defined as a communicating portion 133 that branches from the second gutter 132 and is connected to the first gutter 131.

The first gutter 131 on the right side has an upstream end portion serving as a first oil introducing portion 131a. Arranged beside (on the right side (where the first gutter 131 is positioned) of) the first oil introducing portion 131a are the secondary gears 21 and 22 for first and second gears on the secondary shaft 20. The first oil introducing portion 131a is positioned above the secondary gears 21 and 22 for first and second gears to the advancing side of the rotating direction B (i.e., on the left side) with respect to upper portions of both of these secondary gears 21 and 22 (see FIG. 5). The catching wall 124 catches the oil picked up by the secondary gears 21 and 22 for first and second gears (and the secondary gear 27 for reverse gear when the vehicle is moving forward), and guides the oil to the first oil introducing portion 131a of the first gutter 131.

Also, the second gutter 132 on the left side has an upstream end portion serving as a second oil introducing portion 132a that is bent to the left and of which the tip end is open. The differential gear 51 is positioned beside (i.e., on the left side (where the second gutter 132 is located) of) the second oil introducing portion 132a. The second oil introducing portion 132a is positioned above the differential ring gear 51 to the advancing side of the rotating direction C (i.e., on the right side) with respect to an upper portion of the differential ring gear 51 (see FIG. 5). The catching wall 124 also catches the oil that has been picked up by the differential ring gear 51 and spattered over the second oil introducing portion 132a and guides the oil to the vicinity of the second oil introducing portion 132a of the second gutter 132 (i.e., a portion on the left side of the catching wall 124).

As illustrated in FIG. 4, the first gutter 131 is provided substantially horizontally. In comparison, the second gutter 132 is sloped such that the closer to the rear end, the lower the level of a downstream portion of the second gutter 132 gets. Accordingly, the closer to the rear end, the greater the vertical length of the partition wall 125 gets to close the gap between the first and second gutters 131 and 132.

The first and second gutters 131 and 132 each have a rear end portion which is connected to an associated one of the first and second oil feeders 111 and 112. The first oil feeder 111 is bent to the right to point to the rear end portion of the primary shaft 10. The second oil feeder 112 is extended toward the rear to point to the rear end portion of the secondary shaft 20.

Next, it will be described in detail how the first and second oil feeders 111 and 121 feed oil to the rear end portions of the shafts 10 and 20.

Figure 7:
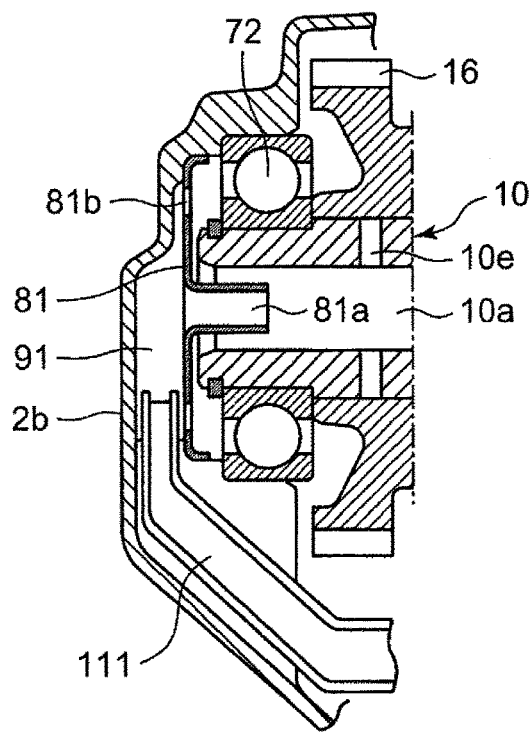
FIG. 7 is a cross-sectional top view of an oil feeding structure provided on a primary shaft side at the back end of the transmission.

First, the oil feeding structure provided for the primary shaft 10 includes a funnel 81 between a bearing 72 that supports the rear end portion of the primary shaft 10 and the rear wall 2b of the case 2 behind the bearing 72, and an oil reservoir 91 that is the space between the funnel 81 and the rear wall 2b of the case 2 as shown in FIG. 7. In the middle of the funnel 81, a tube portion 81a is inserted from the rear side into an intra-shaft oil passage 10a of the primary shaft 10. The funnel 81 also has communicating holes 81b on its peripheral flange portion.

The first oil feeder 111 of the oil-feeding member 100 has its tip portion inserted into the oil reservoir 91 from beside the reservoir. This allows the oil that has flowed through the first gutter 131 of the oil-feeding member 100 to be fed from the first oil feeder 111 to the oil reservoir 91. The oil fed into the oil reservoir 91 is introduced from the oil reservoir 91 through the tube portion 81a of the funnel 81 into the intra-shaft oil passage 10a of the primary shaft 10. The oil fed into the oil reservoir 91 also passes through the communicating holes 81b, and is fed into the bearing 72. The oil introduced into the intra-shaft oil passage 10a flows through the radially extending oil passages 10b to 10e, and is fed to, and lubricates, each of the loosely-fitting engagements between the primary shaft 10 and the primary gears 13 to 16 for third to sixth gears. The oil introduced into the intra-shaft oil passage 10a also lubricates, for example, the sliding surfaces of the synchronizers 42 and 43 for third and fourth gears and for fifth and sixth gears. Furthermore, the oil fed to the bearing 72 is supplied from the bearing 72 to a gear-tooth surface of the primary gear 16 for sixth gear adjacent to the front end of the bearing 72. Here, the gear-tooth surface is a meshing engagement between the primary gear 16 for sixth gear and the secondary gear 26 for sixth gear.

Figure 8:
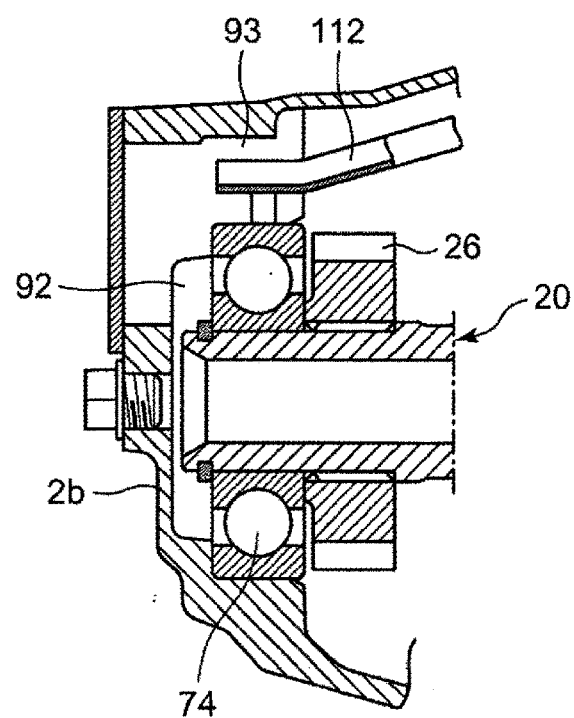
FIG. 8 is a cross-sectional side view of the oil feeding structure provided on a secondary shaft side at the back end of the transmission.

Next, the oil feeding structure provided for the secondary shaft 20 will be described. As illustrated in FIG. 8, an oil reservoir 92 is provided between a bearing 74 that supports the rear end portion of the secondary shaft 20 and the rear wall 2b of the case 2 behind the bearing 74. Above the bearing 74, there is an opening 93 that communicates with the oil reservoir 92. The opening 93 is created by cutting a fitting hole that fits the case 2 into the bearing 74. The second oil feeder 112 of the oil-feeding member 100 is inserted from the front side into the opening 93. This allows the oil which has flowed through the second gutter 132 to be fed from the second oil feeder 112 to the oil reservoir 92. The oil fed into the oil reservoir 92 is then supplied from the oil reservoir 92 to the bearing 74. Furthermore, the oil fed to the bearing 74 is supplied from the bearing 74 to a gear-tooth surface of the secondary gear 26 for sixth gear adjacent to the front end of the bearing 74. Here, the gear-tooth surface is a meshing engagement between the secondary gear 26 for sixth gear and the primary gear 16 for sixth gear.

Note that the tip portion of the first oil feeder 111 is engaged with the oil reservoir 91 from beside the reservoir 91, which regulates an axial position of the oil-feeding member 100. The tip portion of the second oil feeder 112 gets engaged with the opening 93 from the front side, which regulates the horizontal position of a rear portion of the oil-feeding member 100.

Moreover, as illustrated in FIG. 5, the oil-feeding member 100 further includes a rib 126, which is arranged on a sloped bottom of a downstream portion of the second gutter 132. This rib 126, extended from its front end portion connected to the partition wall 125, runs between the partition wall 125 and the side wall 122 on the left side to reach the vicinity of the second oil feeder 112. This rib 126 divides the bottom of the second gutter 132 into a first bottom portion 141 and a second bottom portion 142. In this manner, the second gutter 132 is implemented as a gutter of the present invention.

The second bottom portion 142, provided between the partition wall 125 and the rib 126, extends from a longitudinal middle portion of the second gutter 132 to the vicinity of the second oil feeder 112 (near the rear end of the second gutter 132). The first bottom portion 141 is the rest of the bottom of the second gutter 132 other than the second bottom portion 142. In a downstream portion of the second gutter 132, the first bottom portion 141 is provided between the side wall 122 on the left side and the rib 126. The downstream ends of the first and second bottom portions 141 and 142 are confluent with each other and continuous with the second oil feeder 112.

Figure 9:
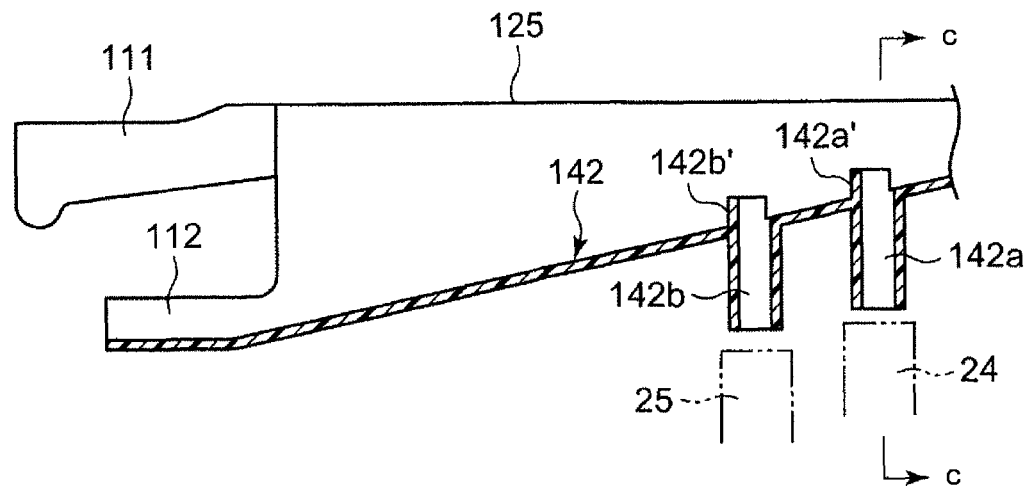
FIG. 9 is an enlarged cross-sectional view of the oil-feeding member as viewed on the plane b-b shown in FIG. 5.
Figure 10:
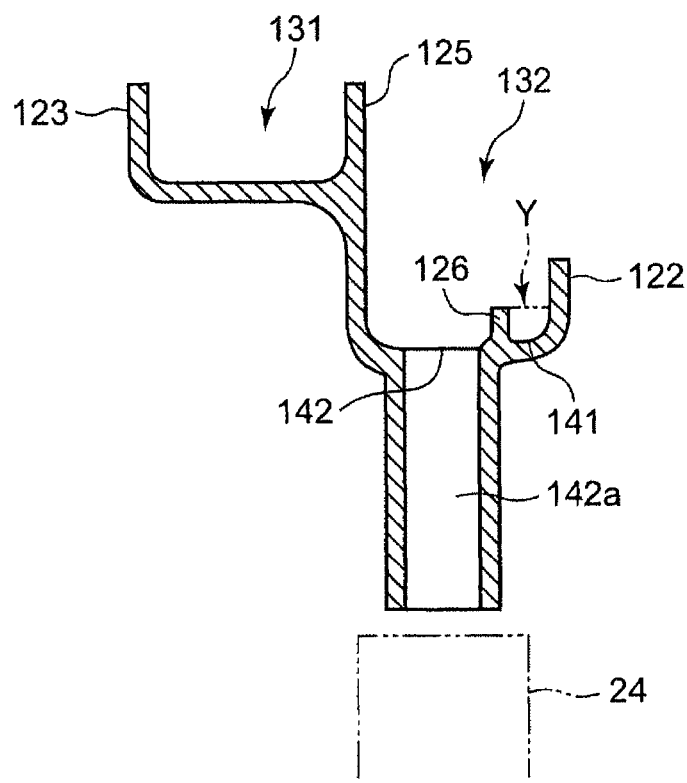
FIG. 10 is an enlarged cross-sectional view of the oil-feeding member as viewed on the plane c-c shown in FIG. 9.

As illustrated in FIGS. 9 and 10, the second bottom portion 142 is provided with oil-dripping holes 142a and 142b. The oil-dripping holes 142a and 142b are positioned above the secondary gears 24 and 25 for fourth and fifth gears, respectively, and allow oil, flowing on the second bottom portion 142, to drip downward.

Here, as indicated by the reference sign Y in FIG. 10, the height of the rib 126 is defined so that the oil flowing on the first bottom portion 141 of the second gutter 132 will overflow into the second bottom portion 142 when the amount of the oil flowing exceeds a preset amount. Thus, the oil drips downward from the second bottom portion 142 through the oil-dripping holes 142a and 142b when the amount of the oil flowing on the first bottom portion 141 of the second gutter 132 exceeds the preset amount.

Note that, as illustrated in FIG. 9, dams 142a' and 142b' are respectively provided downstream of the rim portions of the openings of the oil-dripping holes 142a and 142b. These dams 142a' and 142b' catch the oil flowing on the sloped second bottom portion 142, and allow the oil to drip downward through the respective oil-dripping holes 142a and 142b.

Figure 11:
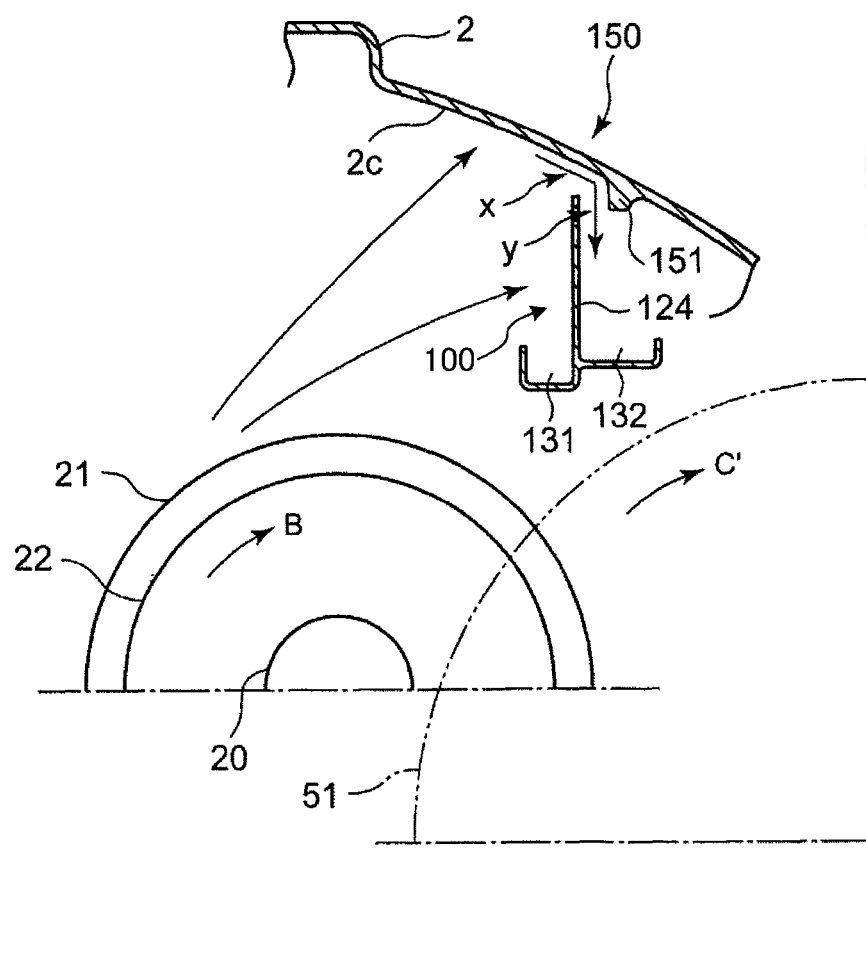
FIG. 11 is a general cross-sectional view of a top portion of a transmission case as viewed on the plane d-d shown in FIG. 3.

In addition to this structure, the case 2 of this embodiment further includes a guiding portion 150 that guides oil, deposited on the ceiling surface 2c of the case 2, to the second gutter 132 of the oil-feeding member 100 as illustrated in FIG. 11. Specifically, the secondary gears 21, 22 and 27 for first, second and reverse gears (or the secondary gears 21 and 22 for first and second gears when the vehicle is moving backward) pick up oil. Then, a portion of the oil picked up spatters toward, and gets deposited on, the ceiling surface 2c of the case 2. Then, the guiding portion 150 guides that oil deposited on the ceiling surface 2c to the second gutter 132.

Specifically, the guiding portion 150 includes the ceiling surface 2c of the case 2 and a rib 151. The ceiling surface 2c is sloped so as to be gradually lowered from the secondary shaft 20 above the oil-feeding member 100 toward the differential ring gear 51. The rib 151 projects downward from the ceiling surface 2c.

As illustrated in FIG. 3, the rib 151, which is provided on the ceiling surface 2c above the second gutter 132 of the oil-feeding member 100, extends in the axial direction of the transmission 1 so as to cover the range from the secondary gears 21 and 22 for first and second gears 21 and 22 through the secondary gear 27 for reverse gear 27.

Then, a gap x is left between an upper end of the catching wall 124 of the oil-feeding member 100 and the ceiling surface 2c of the case 2, and a gap y is left between the rib 151 and an upper end portion of the catching wall 124. In this manner, the guiding portion 150 defines an oil flow path which runs from the ceiling surface 2c on which oil is deposited to the second gutter 132 via the gaps x and y.

Note that the front and rear end portions of the oil-feeding member 100 are supported by the case 2; however, the longitudinal middle portion of the oil-feeding member 100 is not supported by the case 2. Hence, the oil-feeding member 100 is suspended over an upper portion of the case 2. Taking such a suspended state, the dimensional tolerance of each part of the oil-feeding member 100 and the case 2, the surface roughness of the ceiling surface 2c of the case 2, and other factors into consideration, the oil-feeding member 100 needs to be provided such that an upper end of the catching wall 124 does not contact with the ceiling surface 2c. This inevitably creates a gap between the upper end of the catching wall 124 and the ceiling surface 2c. Consequently, it can be said that the guiding portion 150 takes advantage of the gap x thus left.

Next, it will be described exactly how the lubricating structure according to this embodiment works.

As illustrated in FIGS. 2 and 5, the secondary shaft 20 rotates in the direction B and the differential ring gear 51 of the differential gear system 50 rotates in the direction C, when the vehicle is moving forward. As the differential ring gear 51 rotates in the direction C, the oil stored on the bottom of the case 2 gets held on and picked up by, the gear-tooth surfaces of the differential ring gear 51, and spattered from an upper portion of the differential ring gear 51 toward the secondary shaft 20.

Then, the spattered oil is introduced into the second oil-introducing portion 132a of the second gutter 132 in the oil-feeding member 100. In addition, the oil spattered by the differential ring gear 51 over the second oil-introducing portion 132a is caught by a surface of the catching wall 124 that faces the differential ring gear 51 (i.e., the surface in contact with the second gutter 132) in front of the second oil-introducing portion 132a. Then, the oil flows downward along the surface, and is introduced to the vicinity of the second oil-introducing portion 132a of the second gutter 132; that is, a left side portion of the catching wall 124.

Moreover, the secondary gears 21, 22 and 27 for first, second and reverse gears, which rotate in the direction B along with the secondary shaft 20, have their lower portions immersed in the oil on the bottom of the case 2. Hence, as these secondary gears 21, 22, and 27 rotate, the oil gets picked up and spattered toward the differential ring gear 51. Then, the spattered oil is caught on a surface of the catching wall 124 that faces the secondary shaft 20 (i.e., the surface in contact with the first gutter 131) in front of the oil. Then, the oil flows downward along the surface, and is introduced into the first oil-introducing portion 131a of the first gutter 131.

In the meantime, as illustrated in FIG. 11, part of the oil picked up by the secondary gears 21, 22 and 27 for first, second and reverse gears spatters toward the ceiling surface 2c of the case 2, and gets deposited on the ceiling surface 2c. Then, the oil deposited is introduced by the guiding portion 150 into the second gutter 132 of the oil-feeding member 100.

Specifically, the oil that has been spattered by the secondary gears 21, 22, and 27 and deposited on the ceiling surface 2c flows along the sloped ceiling surface 2c toward the second gutter 132, runs through the gap x between the ceiling surface 2c of the guiding portion 150 and the upper end of the catching wall 124, and reaches a side surface of the rib 151. Then, the oil flows from the side surface of the rib 151 through the gap y, drips onto the second gutter 132, and is introduced into the second gutter 132.

Part of the oil thus introduced into the second gutter 132 flows into the first gutter 131 through the communicating passage 133. The rest of the oil flows toward the rear inside the second gutter 132.

The oil that has come from the first oil introducing portion 131a of the first gutter 131 and the oil that has flowed into the first gutter 131 from the second gutter 132 through the communicating passage 133 flow toward the rear inside the first gutter 131. The oil is then fed from the first oil feeder 111 connected to the rear end of the first gutter 131 to the oil reservoir 91 positioned behind the primary shaft 10. Part of the oil fed to the oil reservoir 91 flows from the oil reservoir 91 through the communicating hole 81b on the funnel 81. Then, the oil is fed to the bearing 72 that supports the rear end portion of the primary shaft 10, and then lubricates this bearing 72 and a meshing engagement between the primary gear 16 for sixth gear and the secondary gear 26 for sixth speed that are adjacent to the front end of the bearing 72.

Meanwhile, the rest of the oil fed to the oil reservoir 91 is introduced through the tube portion 81a of the funnel 81 into the intra-shaft oil passage 10a of the primary shaft 10. Then, the rest of the oil flows from the intra-shaft oil passage 10a through the radially extending oil passages 10b to 10e. Then, the oil is fed to, and lubricates, the loosely fitting engagements between the primary shaft 10 and the primary gears 13 to 16 for third to sixth gears. The rest of the oil also lubricates, for example, sliding surfaces of the synchronizers 42 and 43 for third and fourth gears and for fifth and sixth gears.

Furthermore, the secondary gear 22 for second gear picks up oil to feed the oil to a gear-tooth surface of the secondary gear 23 for third gear, too, which is located adjacent to the secondary gear 22 for second gear toward the rear. Here, the gear-tooth surface is a meshing engagement between the secondary gears 23 and 13 for second and third gears. Then, the oil lubricates the meshing engagement.

On the other hand, the oil that has been introduced into the second gutter 132 and that has not flowed into the communicating passage 133 flows toward the rear along the second gutter 132. Here, the bottom of the second gutter 132 is divided by the rib 126 into the first and second bottom portions 141 and 142 as described above. The oil that has been introduced into the second gutter 132 and that has not flowed into the communicating passage 133 will basically flow over the first bottom portion 141. However, if the amount of the oil flowing over the first bottom portion 141 is greater than the preset amount, the oil will run over the rib 126 and overflow toward the second bottom portion 142. As a result, the oil that been introduced into the second gutter 132 and that has not flowed into the communicating passage 133 will flow over the first and second bottom portions 141 and 142.

When the vehicle is moving forward, the second gutter 132 receives a lot of the oil that has been picked up by the differential ring gear 51, in addition to the oil that has been picked up as described above by the secondary gears 21, 22 and 27 for first, second and reverse gears and introduced via the guiding portion 150 provided on a ceiling portion of the case 2. Here, the differential ring gear 51 is immersed deep into the oil on the bottom of the case 2, and has a greater face width than a speed gear. As a result, the amount of oil caught by the oil-feeding member 100 exceeds the predetermined amount. At this point in time, the amount of the oil flowing on the first bottom portion 141 of the second gutter 132 exceeds the preset amount. Consequently, the oil flowing over the first bottom portion 141 runs over the rib 126 and overflows toward the second bottom portion 142. Therefore, the oil that has been introduced into the second gutter 132 and that has not flowed into the communicating passage 133 flows through both of the first and second bottom portions 141 and 142 toward a downstream point.

The two oil flows that have run over the first and second bottom portions 141 and 142 are confluent with each other at a point before the second oil feeder 112, and then introduced from the second oil feeder 112 into the oil reservoir 92 positioned behind the secondary shaft 20 as illustrated in FIG. 8. The oil is then fed from the oil reservoir 92 to, and lubricates, the bearing 74 (which is equivalent to a bearing that acts as a part-to-be-lubricated on the other side according to the present invention and that supports the secondary shaft 20) that supports the rear end portion of the secondary shaft 20. Meanwhile, the oil that has passed through the bearing 74 is fed to the secondary gear 26 for sixth gear, and lubricates the meshing engagement (equivalent to the part-to-be-lubricated according to the present invention) between the primary gear 16 for sixth gear and the secondary gear 26 for sixth gear.

Part of the oil that has overflowed toward the second bottom portion 142 drips through the oil-dripping holes 142a and 142b, which are cut through the second bottom portion 142, onto the gear-tooth surfaces of the secondary gears 24 and 25 for fourth and fifth gears located under the oil-dripping holes 142a and 142b. This dripping oil lubricates a meshing engagement between the primary gear 14 for fourth gear and the secondary gear 24 for fourth gear, and a meshing engagement between the primary gear 15 for fifth gear and the secondary gear 25 for fifth gear. In this case, dams 142a' and 142b' are respectively provided on the rim portions of the openings of the oil-dripping holes 142a and 142b of the second bottom portion 142, thus ensuring that a required amount of oil is fed to each meshing engagement (equivalent to an intermediately placed part-to-be-lubricated according to the present invention).

In this manner, when the vehicle is moving forward, the oil is fed to, and lubricates, the meshing engagements of respective gears included in the gear trains for third, fourth, fifth and sixth gears G3, G4, G5 and G6 that are arranged from an axial intermediate portion toward the rear end of the transmission 1 and that often get ready to transmit power, the synchronizer 42 for third and fourth gears and the synchronizer 43 for fifth and sixth gears that also often get ready to transmit power, and the bearings 72 and 74 that respectively support the rear end portions of the primary and secondary shafts 10 and 20 to transmit power.

On the other hand, when the vehicle is moving backward, the differential ring gear 51 rotates in the direction C' as illustrated in FIGS. 2 and 11, and spatters the oil in the opposite direction from the one in which the oil-feeding member 100 is arranged. Hence, the oil picked up by the rotating differential ring gear 51 is not caught by the oil-feeding member 100. Thus, when the vehicle is moving backward, only the oil picked up by the secondary gears 21 and 22 for first and second gears rotating in the same direction as when the vehicle is moving forward is caught by the oil-feeding member 100. In this case, the amount of the oil introduced into the oil-feeding member 100 decreases significantly compared to when the vehicle is moving forward. Specifically, the amount of the oil caught by the oil-feeding member 100 becomes smaller than the predetermined amount.

The oil which has been picked up by the rotating secondary gears 21 and 22 for first and second gears and has spattered toward the oil-feeding member 100 gets deposited on a surface of the catching wall 124 of the oil-feeding member 100 in contact with the first gutter 131. Then, the oil runs downward along the surface, enters the first gutter 131, flows toward the rear through the first gutter 131, and then is fed from the first oil feeder 111 to the oil reservoir 91 behind the primary shaft 10.

Then, in the same way as when the vehicle is moving forward, part of the oil fed to the oil reservoir 91 is supplied through the communicating hole 81b of the funnel 81 to bearing 72. Then, the oil lubricates the bearing 72, and the meshing engagement between the primary gear 16 for sixth gear and the secondary gear 26 for sixth gear.

The rest of the oil fed to the oil reservoir 91 flows from the tube portion 81a of the funnel 81 through the intra-shaft oil passage 10a of the primary shaft 10 and the oil passages 10b to 10e. Then, the rest of the oil is fed to, and lubricates, the loosely-fitting engagements of the primary gears 13 to 16 for third to sixth gears for the primary shaft 10, and the sliding surfaces of the synchronizer 42 for third and fourth gears and the synchronizer 43 for fifth and sixth gears.

Part of the oil which has been picked up by the rotating secondary gears 21 and 22 for first and second gears and has spattered toward the oil-feeding member 100 gets deposited on the ceiling surface 2c of the case 2. Then, the oil is introduced as described above by the guiding portion 150 into the second gutter 132 of the oil-feeding member 100.

The oil that has been introduced into the second gutter 132 and that has not flowed from the communicating passage 133 toward the first gutter 131 flows over the first bottom portion 141 of the second gutter 132. Then, the oil is introduced from the second oil feeder 112 into the oil reservoir 92 behind the secondary shaft 20, and then is supplied from the oil reservoir 92 to the bearing 74, and the meshing engagement between the primary gear 16 for sixth gear and the secondary gear 26 for sixth gear.

In this case, the oil that flows over the first bottom portion 141 of the second gutter 132 is only a part of the oil that has been picked up by the secondary gears 21 and 22 for first and second gears, deposited on the ceiling surface 2c of the case 2, introduced into the second gutter 132 via the guiding portion 150, and not supplied into the communicating passage 133. Thus, the amount of the oil that flows over the first bottom portion 141 of the second gutter 132 becomes smaller than or equal to the preset amount. As a result, the oil that flows over the first bottom portion 141 will not run over the rib 126 and overflow toward the second bottom portion 142.

Consequently, no oil drips through the oil-dripping holes 142a and 142b of the second bottom portion 142, and therefore, no oil is fed to the meshing engagement between the primary gear 14 for fourth gear and the secondary gear 24 for fourth gear or to the meshing engagement between the primary gear 15 for fifth gear and the secondary gear 25 for fifth gear. When the vehicle is moving backward, however, these gears meshing with each other are simply idling without transmitting power. This eliminates the need for feeding oil to these meshing engagements, and thus causes no problem due to insufficient oil feeding.

On the other hand, the oil that has flowed over the first bottom portion 141 of the second gutter 132 is fed through the second oil feeder 112 to the bearing 74, which supports the rear end portion of the secondary shaft 20 that is not only rotating but also transmitting power even when the vehicle is moving backward.

That is to say, when the vehicle is moving backward, just a little oil is expectedly introduced into the oil-feeding member 100 by being picked up by the rotating secondary gears 21 and 22 for first and second gears and only a part of that oil reaches a point downstream of the second gutter 132. In such a situation, that small amount of oil will not be unnecessarily fed to the meshing engagement that does not need oil feeding. Instead, that small amount of oil will be fed to the bearing 74 that does need oil feeding. Consequently, a required amount of oil can be fed just as intended to a necessary part, even if the amount of oil stored on the bottom of the case 2 is not increased. Thus, by cutting down the amount of oil to be stored on the bottom of the case 2, an increase in oil agitation resistance by a gear and the weight of the vehicle can be reduced, and the fuel efficiency of the engine is improved.

In this case, in the oil-feeding member 100 according to this embodiment, the first bottom portion 141 of the second gutter 132 is formed so as to have a narrower downstream (rear-end) width than its upstream (front-end) width. The second bottom portion 142 is arranged adjacent to the narrower downstream portion of the first bottom portion 141. This makes the sum of the widths of the first and second bottom portions 141 and 142 substantially equal to the width of a part of the first bottom portion 141 which is located upstream of the second bottom portion 142 and downstream of the branching point of the communicating portion 133.

As a result, even if the first and second bottom portions 141 and 142 are arranged side by side, an increase in the width of the second gutter 132, and eventually an increase in the overall width of the oil-feeding member 100, can still be reduced. This ensures that the oil-feeding member 100 is stored in the case 2 easily. Moreover, a downstream portion of the first bottom portion 141 has a narrower width than an upstream portion thereof. The narrower downstream width allows the oil to flow faster over the first bottom portion 141. This contributes to feeding, just as intended, the oil to the bearing 74 that supports the rear end portion of the secondary shaft 20 even when the vehicle is moving backward with not much oil fed.

Note that, even when the vehicle is at a stop, the secondary gears 21 and 22 for first and second gears rotate in the direction B while the primary shaft 10 is rotating. Hence, in the same way as when the vehicle is moving backward, oil is also fed to the oil reservoir 92 (the bearing 74) behind the secondary shaft 20, as well as to the oil reservoir 91 behind the primary shaft 10.

The present invention is not limited to the embodiments described above. Any modification may be readily made to the embodiments unless those modifications depart from the scope of the present invention as defined by the appended claims.

Figure 12:
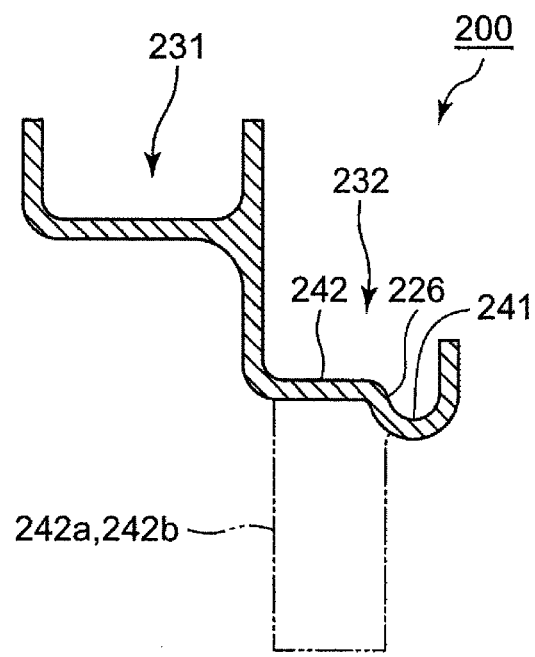
FIG. 12 is a plan view illustrating a modified example of the oil-feeding member illustrated in FIG. 10.

For example, in the embodiment described above, the first and second bottom portions 141 and 142 of the second gutter 132 are supposed to be separated from each other by the rib 126; instead, the first and second bottom portions 141 and 142 may also be separated from each other by a step, for example. A modified oil-feeding member having such a step will be described with reference to FIG. 12.

Just like the oil-feeding member 100, an oil-feeding member 200 according to this modified example also includes a first gutter 231 and a second gutter 232. A first bottom portion 241 and a second bottom portion 242 located downstream of the second gutter 232 are separated from each other by a step 226 that positions the first bottom portion 241 at a lower level than the second bottom portion 242. The rest of the structure of the oil-feeding member 200 is the same as that of the oil-feeding member 100.

Similarly to the height of the rib 126, the height of the step 226 is also defined such that the oil flowing over the first bottom portion 241 of the second gutter 232 will start to overflow toward the second bottom portion 242 when the amount of the oil exceeds the preset amount.

In this modified example, when the vehicle is moving forward, i.e., when the amount of oil caught by the oil-feeding member 200 becomes greater than the predetermined amount, the amount of the oil flowing over the first bottom portion 241 of the second gutter 232 exceeds the preset amount, and the oil flowing over the first bottom portion 241 overflows toward the second bottom portion 242. This allows the oil to drip through the oil-dripping holes 242a and 242b of the second bottom portion 242. On the other hand, when the vehicle is moving backward, i.e., when the amount of oil caught by the oil-feeding member 200 becomes smaller than or equal to the predetermined amount, the amount of the oil flowing over the first bottom portion 241 of the second gutter 232 becomes smaller than or equal to the preset amount, and the oil flowing over the first bottom portion 241 does not overflow toward the second bottom portion 242. This reduces unnecessary oil dripping through the oil-dripping holes 242a and 242b of the second bottom portion 242. Consequently, with a reduced amount of oil stored on the bottom of the case 2, the oil can be fed just as intended to the bearing 74 that supports the rear end portion of the secondary shaft 20, to which the oil needs to be fed even when the vehicle is moving backward.

The embodiments described above are merely preferred examples in nature, and are not intended to limit the scope of the present invention. The scope of the present invention is defined only by the claims, and any modifications or changes that are deemed to be equivalent to any of those claims all fall within the scope of the present invention.

INDUSTRIAL APPLICABILITY

The present invention is useful as a structure for lubricating a transmission (in particular, a manual transmission) which is provided for a vehicle and which includes an oil-feeding member that is arranged in a transmission case and that catches the oil picked up by a gear.

DESCRIPTION OF REFERENCE CHARACTERS

1 Transmission
10 Primary Shaft
20 Secondary Shaft
100 Oil-Feeding Member
126 Rib
132 Second Gutter (an example of a gutter of the present invention)
141 First Bottom Portion
142 Second Bottom Portion
142a Oil-Dripping Hole
142b Oil-Dripping Hole
200 Oil-Feeding Member
226 Step
232 Second Gutter
241 First Bottom Portion
242 Second Bottom Portion
242a Oil-Dripping Hole
242b Oil-Dripping Hole

The invention claimed is:

1. A structure for lubricating a transmission to be provided for a vehicle, the structure comprising an oil-feeding member arranged in a transmission case and configured to catch oil picked up by a gear, wherein the oil-feeding member includes a gutter with an oil-dripping hole that is cut through a bottom of the gutter, the gutter guiding the oil that has been caught from one side of the transmission in an axial direction to feed the oil to a part-to-be-lubricated which is provided in the transmission case and positioned on another side of the transmission, the oil-dripping hole allowing the oil to drip to an intermediately placed part-to-be-lubricated which is also provided in the transmission case and positioned at an intermediate position in the axial direction, the bottom of the gutter is divided into a first bottom portion and a second bottom portion that converge to a common outlet, the second bottom portion being provided with the oil-dripping hole being cut through the second bottom portion, and the first and second bottom portions are configured so that (i) the oil flows over only the first bottom portion toward the part-to-be-lubricated if an amount of the oil caught by the oil-feeding member is smaller than or equal to a predetermined amount, and that (ii) the oil flows over both of the first and second bottom portions toward the part-to-be-lubricated if the amount of the oil caught by the oil-feeding member is greater than the predetermined amount.

2. The structure of claim 1, wherein the first bottom portion of the gutter is formed so as to have an upstream width at a front-end or upstream location and a narrower width than the upstream width at a location downstream from the upstream location that is near to the convergence of the first bottom portion and the second bottom portion.

3. The structure of claim 2, wherein the first and second bottom portions are separated from each other by a rib or step provided on the bottom of the gutter.

4. The structure of claim 3, wherein the part-to-be-lubricated includes a bearing configured to support a secondary shaft which extends parallel to a primary shaft acting as an input shaft of the transmission, the gear includes a differential ring gear and a driven gear for a transmission gear range of forward and low speed, the differential ring gear rotating, when the vehicle is moving backward, in an opposite direction from when the vehicle is moving forward, the driven gear being loosely fitted to the secondary shaft and rotating, when the vehicle is moving backward, in the same direction as when the vehicle is moving forward, the oil-feeding member is configured to catch the oil picked up by the differential ring gear and the driven gear when the vehicle is moving forward, and catch the oil picked up only by the driven gear when the vehicle is moving backward, and the intermediately placed part-to-be-lubricated transmits power through the transmission when the vehicle is moving forward and leaves the power untransmitted when the vehicle is moving backward.

5. The structure of claim 2, wherein the part-to-be-lubricated includes a bearing configured to support a secondary shaft which extends parallel to a primary shaft acting as an input shaft of the transmission, the gear includes a differential ring gear and a driven gear for a transmission gear range of forward and low speed, the differential ring gear rotating, when the vehicle is moving backward, in an opposite direction from when the vehicle is moving forward, the driven gear being loosely fitted to the secondary shaft and rotating, when the vehicle is moving backward, in the same direction as when the vehicle is moving forward, the oil-feeding member is configured to catch the oil picked up by the differential ring gear and the driven gear when the vehicle is moving forward, and catch the oil picked up only by the driven gear when the vehicle is moving backward, and the intermediately placed part-to-be-lubricated transmits power through the transmission when the vehicle is moving forward and leaves the power untransmitted when the vehicle is moving backward.

6. The structure of claim 1, wherein the first and second bottom portions are separated from each other by a rib or step provided on the bottom of the gutter.

7. The structure of claim 6, wherein the part-to-be-lubricated includes a bearing configured to support a secondary shaft which extends parallel to a primary shaft acting as an input shaft of the transmission, the gear includes a differential ring gear and a driven gear for a transmission gear range of forward and low speed, the differential ring gear rotating, when the vehicle is moving backward, in an opposite direction from when the vehicle is moving forward, the driven gear being loosely fitted to the secondary shaft and rotating, when the vehicle is moving backward, in the same direction as when the vehicle is moving forward, the oil-feeding member is configured to catch the oil picked up by the differential ring gear and the driven gear when the vehicle is moving forward, and catch the oil picked up only by the driven gear when the vehicle is moving backward, and the intermediately placed part-to-be-lubricated transmits power through the transmission when the vehicle is moving forward and leaves the power untransmitted when the vehicle is moving backward.

8. The structure of claim 1, wherein the part-to-be-lubricated includes a bearing configured to support a secondary shaft which extends parallel to a primary shaft acting as an input shaft of the transmission, the gear includes a differential ring gear and a driven gear for a transmission gear range of forward and low speed, the differential ring gear rotating, when the vehicle is moving backward, in an opposite direction from when the vehicle is moving forward, the driven gear being loosely fitted to the secondary shaft and rotating, when the vehicle is moving backward, in the same direction as when the vehicle is moving forward, the oil-feeding member is configured to catch the oil picked up by the differential ring gear and the driven gear when the vehicle is moving forward, and catch the oil picked up only by the driven gear when the vehicle is moving backward, and the intermediately placed part-to-be-lubricated transmits power through the transmission when the vehicle is moving forward and leaves the power untransmitted when the vehicle is moving backward.

9. The structure of claim 1, wherein the first and second bottom portions are configured to extend in parallel with each other.

\* \* \* \* \*